US012639420B2

(12) United States Patent
Vasudevan et al.

(10) Patent No.: US 12,639,420 B2
(45) Date of Patent: May 26, 2026

(54) SYSTEM AND METHOD FOR FORMAL MODELLING OF TRUSTED EDGE IoT SECURITY GATEWAYS

(71) Applicant: CARNEGIE MELLON UNIVERSITY, Pittsburgh, PA (US)

(72) Inventors: Amit Vasudevan, Pittsburgh, PA (US); Matthew McCormack, Pittsburgh, PA (US); Vyas Sekar, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 150 days.

(21) Appl. No.: 18/576,199

(22) PCT Filed: Jul. 13, 2022

(86) PCT No.: PCT/US2022/036906
§ 371 (c)(1),
(2) Date: Jan. 3, 2024

(87) PCT Pub. No.: WO2023/022816
PCT Pub. Date: Feb. 23, 2023

(65) Prior Publication Data
US 2024/0346132 A1 Oct. 17, 2024

Related U.S. Application Data

(60) Provisional application No. 63/234,913, filed on Aug. 19, 2021.

(51) Int. Cl.
*H04L 29/06* (2006.01)
*G06F 21/53* (2013.01)

*G16Y 30/10* (2020.01)
*H04L 9/40* (2022.01)

(52) U.S. Cl.
CPC .............. *G06F 21/53* (2013.01); *G16Y 30/10* (2020.01); *H04L 63/14* (2013.01); *H04L 63/20* (2013.01)

(58) Field of Classification Search
CPC ..... G06F 21/53; H04L 63/14; H04L 63/0263; H04L 63/08; H04L 63/20; H04L 63/10
See application file for complete search history.

(56) References Cited

U.S. PATENT DOCUMENTS

2021/0017242 A1 1/2021 Abad Mendez
2021/0117242 A1* 4/2021 Van De Groenendaal .................
G06F 9/522

OTHER PUBLICATIONS

McCormack et al. ("Towards an Architecture for Trusted Edge IoT Security Gateways" HotEdge'20 Workshop, available on or before Jun. 12, 2020 (Year: 2020).*

(Continued)

*Primary Examiner* — Longbit Chai
(74) *Attorney, Agent, or Firm* — KDW FIRM PLLC

(57) ABSTRACT

Disclosed herein is a method for defining a model of a trusted IoT security gateway architecture based on a micro-hypervisor, wherein evaluation of the model provides a guarantee that the correct security protections are applied to each IoT device's network traffic at all times, including when under attack. The models defined in accordance with the method disclosed herein are used to verify security gateway architectures that provide robust trust properties to a broad range of legacy hardware platforms utilizing existing software with a reasonable performance overhead.

12 Claims, 7 Drawing Sheets

(56)     References Cited

OTHER PUBLICATIONS

International Search Report and Written Opinion for Application No. PCT/US2022/036906 dated Nov. 30, 2022.

McCormack, Matt et al, "Towards an Architecture for Trusted Edge IoT Security Gateways," http://www.usenix.org/systems/files/hotedge20_paper_mccormack.pdf, Jun. 12, 2020.

McCormack, Matt et al, "Formalizing an Architectural Model for a Trustworthy Edge IoT Security Gateway," IEEE, Sep. 27, 2021.

Mazhar, Noman et al, "Role of Device Identification and Manufacturer Usage Description in IoT Security: A Survey," IEEE , Mar. 19, 2021.

* cited by examiner

Listing 1 Abridged formal model of JETFIRE's trusted software-defined security gateway architecture.

```
1:  sig Controller {
2:      policy : one Policy,
3:      cntrlChannel: one Channel
4:  }

5:  sig Gateway {
6:      vswitch : one vSwitch,
7:      mbox : set Middlebox,
8:      controller : one Controller,
9:      cntrlChannel: one Channel
10: }

11: function PROCESSPKT(pkt : Packet, g : Gateway)
12:     g.mbox_i = ROUTEPKT(pkt, g.vswitch)
13:     pkt.state = MIDDLEBOXPROCESS(pkt, g.mbox_i)
14:     if pkt.state === Benign then
15:         pkt.action = Allow
16:     else
17:         pkt.action = Drop
18:     return pkt.action 19: pred TRUSTEDGATEWAY(g : Gateway, c : Controller)
20:     c === g.controller
21:     TAMPERPROOF(c.policy)
22:     SECURECHANNEL(g.cntrlChannel, c.cntrlChannel)
23:     REMOTEATTEST(g.controller)
24:     REMOTEATTEST(g.vswitch)
25:     for g.mbox_i in c.policy do
26:         REMOTEATTEST(g.mbox_i)
27:         AUTHENTICATEROUTE(g.vswitch, g.mbox_i)

28: assert PROCESSPKTCORRECTLY(g : Gateway, pkt : Packet)
29:     TRUSTEDGATEWAY(g)
30:     pkt ∈ BenignPkts ⟹ PROCESSPKT(pkt, g) === Allow
31:     pkt ∈ MaliciousPkts ⟹ PROCESSPKT(pkt, g) === Drop
```

*FIG. 5*

Listing 2 Alloy model of policy isolation and mediation.

```
1: pred TAMPERPROOF(obj : Object)
2:     ISOLATEDMEMORY(obj)
3:     MEDIATEDACCESS(obj)

4: assert TRUSTWORTHYPOLICY(c : Controller)
5:     TAMPERPROOF(c.policy)
```

FIG. 6

Listing 3 Alloy model of instance validation.

```
1: pred REMOTEATTEST(obj : Object)
2:     CORRECTSOFTWARE(obj)
3:     ATTESTCORRECTNESS(obj)

4: assert CORRECTINSTANCE(c : Controller)
5:     REMOTEATTEST(c)

6: assert CORRECTINSTANCE(g : Gateway)
7:     REMOTEATTEST(g.vswitch)
8:     for g.mbox_i in g do
9:         REMOTEATTEST(g.mbox_i)
```

Listing 4 Alloy model of message integrity and authentication.

```
1: pred TRUSTWORTHYCHANNEL(ch : Channel, k : Key)
2:     AUTHENTICATEDENCRYPTED(ch)
3:     TAMPERPROOF(k)

4: assert SECURECHANNEL(c : Controller, g : Gateway)
5:     SAMECHANNEL(c.cntrlChannel, g.cntrlChannel)
6:     TRUSTWORTHYCHANNEL(c.cntrlChannel, c.cntrlChannel.key)
7:     TRUSTWORTHYCHANNEL(g.cntrlChannel, g.cntrlChannel.key)
```

Listing 5 Alloy model of packet path and data validation.

```
1: function GETPATH(pkt : Packet, p : Policy)
2:     mbox = GETMBOXFROMPOLICY(p, pkt)
3:     path = {vswitch, mbox, vswitch}
4:     return path 5: pred AUTHENTICATEHOP(pkt : Packet, h : HopLocation)
6:     UNMODIFIEDDATA(pkt)
7:     CORRECTHOPLOCATION(h)

8: assert CORRECTPATH(pkt : Packet, path : Path, p : Policy)
9:     path.vswitch, path.mbox  in GETPATH(p, policy)

10: assert AUTHENTICATEPKTROUTE(pkt : Packet, p : policy)
11:     path = GETPATH(pkt, p)
12:     CORRECTPATH(pkt, path, p)
13:     for hop in path do
14:         AUTHENTICATEHOP(p, hop)
```

SYSTEM AND METHOD FOR FORMAL MODELLING OF TRUSTED EDGE IoT SECURITY GATEWAYS

RELATED APPLICATIONS

This application is a national filing under 35 U.S.C. § 371 claiming the benefit and priority to International Patent Application No. PCT/US22/36906, filed Jul. 13, 2022 entitled "System and Method for Formal Modelling of Trusted Edge IoT Security Gateways", which claims the benefit of U.S. Provisional Patent Application No. 63/234,913, filed Aug. 19, 2021, the contents of which are incorporated herein by reference.

GOVERNMENT INTEREST

This invention was made with United States Government support under FA8702-15-D-0002 awarded by the Air Force Life Cycle Management Center. The U.S. Government has certain rights in this invention

BACKGROUND OF THE INVENTION

The Internet of Things (IoT) describes a network of physical devices having embedded sensors, software and other components that allow the object to perform a task and connect and exchange data with other devices over the internet. These devices range from ordinary household objects to sophisticated industrial tools.

An increasing number of IoT devices are deployed into edge environments, from home networks to manufacturing floors. Unfortunately, these devices are plagued by a myriad of vulnerabilities, which attackers have been able to exploit as stepping stones into protected networks and as launch pads for other attacks. Consequently, these IoT devices pose a continuing threat to the security of edge networks.

Industry and academia have proposed securing potentially vulnerable IoT devices on edge networks with on-site security gateways. These "bolt-on" security gateways are designed to intercept all traffic to and from an IoT device and apply security protections via middleboxes at the network level (e.g., a firewall). These middleboxes can be used to implement "network patches" which mitigate a device's vulnerabilities without patching the device's software.

While bolt-on security gateways are gaining popularity and are a deployable solution, the fundamental question of the trustworthiness of the system providing the network level protections remains. As an example scenario, consider a smart factory with a plethora of IoT devices protected by multiple security gateways. The factory's security gateways provide network level protections tailored to each individual IoT device's vulnerabilities. Unfortunately, security gateways form a single point of failure. They are particularly vulnerable to an adversary who can compromise the security gateway (by exploiting OS and/or application vulnerabilities), as the gateway typically runs commodity software (e.g., Linux, Docker, OVS, Snort, etc.). Once compromised, an adversary can modify the gateway's protections (e.g., remove a firewall rule) thereby enabling attacks against an IoT device to stop/alter production.

Current approaches for securing applications in untrusted cloud environments could potentially be applied to establish trust in security gateways. These approaches rely on hardware specific capabilities (e.g., SGX, MPX). Unfortunately, such approaches have high performance overheads, rendering them impractical for IoT deployments. They also lack generality, being limited to a specific processor class, and only support user space applications with constrained memory allocation. Furthermore, addressing security vulnerabilities requires fabricating newer revisions of the hardware.

SUMMARY OF THE INVENTION

Disclosed herein is a method for defining a model of a trusted IoT security gateway architecture based on a microhypervisor, wherein evaluation of the architectural model provides a formal (mathematical) guarantee that the correct security protections are applied to each IoT device's network traffic at all times, including when under attack. The models defined in accordance with the method disclosed herein are used to verify security gateway architectures that provide robust trust properties to a broad range of legacy hardware platforms utilizing existing software with a reasonable performance overhead.

As disclosed herein, a microhypervisor-based approach is used as an architectural basis for building trust in edge security gateways. A microhypervisor, like a traditional hypervisor, is a software reference monitor that provides core security capabilities (e.g., memory isolation, mediation, and attestation) that can be applied to effectively address the aforementioned challenges. In contrast to traditional hypervisors, a microhypervisor provides these capabilities with a dramatically reduced trusted computing base (TCB) and complexity which enables formal verification to rule out potential vulnerabilities. Furthermore, microhypervisors provide an extensible foundation for realizing robust trust properties without a loss of generality and minimal performance overhead. Lastly, in contrast to approaches using specific hardware capabilities which limit applications (e.g., SGX's limitations previously described), microhypervisors can support a variety of hardware platforms (e.g., x86, ARM, microcontroller) running unmodified software (e.g., Linux). Thus, a microhypervisor provides a practical and secure foundation for building security mechanisms.

Heretofore, microhypervisors have not been used in edge IoT gateways. As such, the novelty of this invention is derived from a more holistic system adversary model for an edge IoT security gateway and a high-level architecture based on microhypervisors to enable a practical and flexible solution with formally proven security properties.

BRIEF DESCRIPTION OF THE DRAWINGS

FIG. 5 is a listing in the Alloy modeling language showing an abridged formal model of the software-defined security gateway architecture.

FIG. 6 shows the Alloy model of policy isolation and mediation.

FIG. 7 shows the Alloy model of instance validation.

FIG. 8 shows the Alloy model of message integrity and authentication.

FIG. 9 shows the Alloy model of packet path and data validation

DETAILED DESCRIPTION

Figure 1:
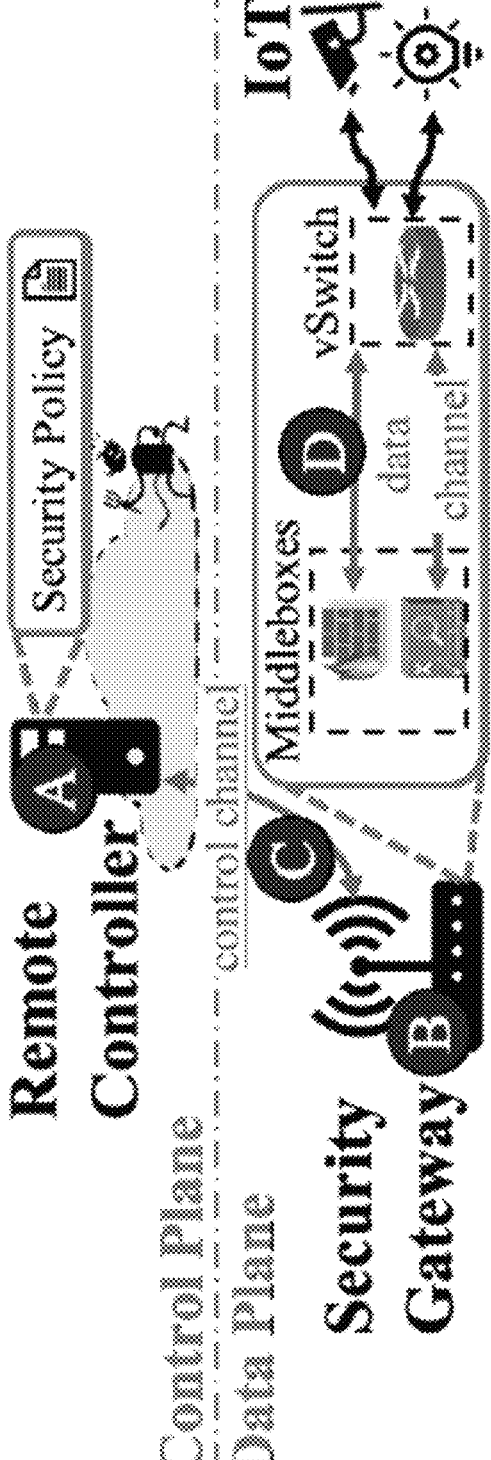
FIG. 1 is a schematic drawing illustration various attack vectors associated with an IoT device.

FIG. 1 shows various attack vectors from which bolt-on security architectures are vulnerable. An attacker could launch attacks at multiple points in the architecture. For example, an attacker could: (1) use an unpatched exploit to compromise the gateway itself ("B") and (2) modify the middlebox configuration such that it allows the attacker's traffic to pass through to enable the attacker to compromise a factory's IoT device and steal proprietary data ("A"). Beyond modifying the software, an attacker could also tamper with network messages. For example, modifying packets on the control channel between the controller and gateway ("C") and data channel between the vSwitch and the middlebox ("D"), redirecting traffic to the wrong middlebox, evading security inspections. A trusted security architecture needs to protect the gateway and controller's software while prohibiting tampering with network traffic.

To address these various attack vectors, disclosed herein is a system and methods implementing a trusted, extensible, and widely-deployable edge security gateway architecture that addresses the security challenges of today's edge IoT deployments.

The design space can be categorized along two axes. First, approaches dependent on hardware functionality are limited in both the hardware platforms and software they can support. Additionally, their security properties rest on a complex and opaque implementation in microcode and silicon, known to have vulnerabilities. Second, pure software approaches (e.g., formal verification, secure programming languages) are limited as they require significant reimplementation and verification effort. As many commonly used software applications on edge security gateways span over 100,000 lines of C/Java this quickly becomes intractable.

It is dangerous to tie critical security features to either hardware implementations that require new hardware to address threats, or to software approaches that require significant reimplementation or formal verification effort of the entire software stack. Instead, the present architecture leverages legacy hardware features in combination with a small TCB and extensible software framework to provide fundamental trust properties and protect edge devices from evolving threats.

Figure 2:
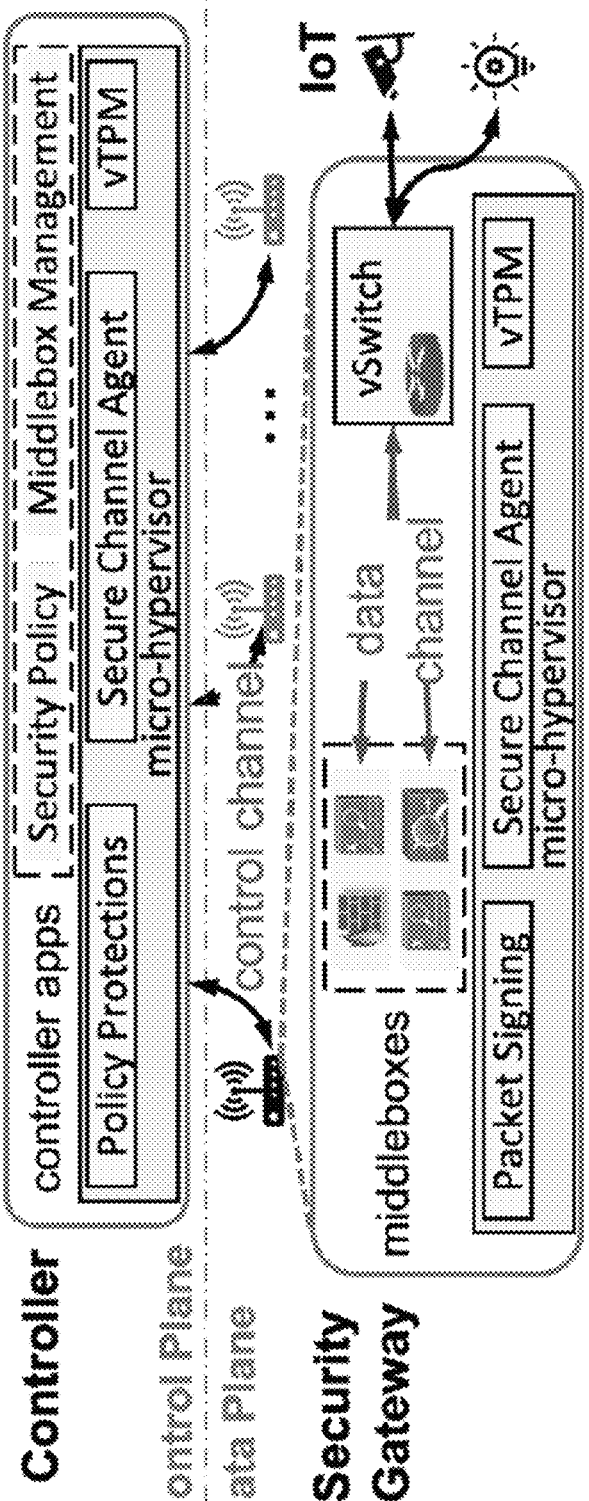
FIG. 2 is a high-level block diagram of a trusted, extensible, and widely-deployable edge security gateway architecture.

Consequently, a microhypervisor-based approach is disclosed herein to enable a trusted edge security gateway architecture, shown in FIG. 2, that retrofits security protections to only the necessary system components. A microhypervisor is in essence a software reference monitor that acts as a guardian, implementing access control to system resources (e.g., files, sockets) using a small TCB. These protections can be applied in a fine-grained manner, protecting a single data value (e.g., secret key) or a complex set of objects (e.g., a virtual machine) with minimal performance overhead. Microhypervisors provide a strong foundation for fine-grained mediation, isolation, and attestation with a small TCB, which allows for security services to be designed and implemented as extensions.

Due to their simplicity and small TCB, microhypervisors are amenable to formal verification for ruling out potential vulnerabilities within their code. Additionally, microhypervisors can potentially be supported on any hardware platform. The invention is built on top of the aforementioned microhypervisor-enabled foundational capabilities to construct a trusted security gateway architecture. The software of the controller and gateway run on top of a microhypervisor, thereby supporting any commodity OS and application stack. On the controller, critical data (e.g., the security policy) is migrated into microhypervisor extensions to isolate it from untrusted software (e.g., the OS). Further, all access is mediated by the microhypervisor, prohibiting an attacker from subverting the data's integrity.

On the gateway, a set of customized middleboxes is assigned to each device. The middleboxes are isolated from each other. Middleboxes are processing elements or virtual machines which are assigned to a single IoT device and which are attested on startup by the microhypervisor. Additionally, the signature of each middlebox and the vSwitch is periodically monitored to verify their integrity. Finally, the controller and the gateway run trusted agents, which are microhypervisor extensions used to mediate communication between the control and data planes, to ensure the instantiated protections correctly reflect the security policy.

The microhypervisor-based architecture provides three key benefits. First, it provides fine-grained isolation and mediation which allow for precisely ensuring that the architecture enforces the correct protections while being performant. Second, it is extensible allowing for rapid growth of new security functionality and response to emerging threats. Third, it is widely-deployable, supporting a wide range of hardware platforms while utilizing existing software, with a low performance overhead for providing trust.

There are three challenges that the disclosed architecture and associated formal modeling addresses: (1) Necessary Security Properties: Identify the security properties that ensure trust under a holistic adversary model; (2) Support Dynamic Middleboxes: Enable protecting the dynamic middleboxes required by an IoT environment, ensuring an adversary cannot modify the protections; and (3) Secure Communications: Provide per-packet protections with a low performance impact, guaranteeing an adversary cannot modify or spoof packets. The key building blocks of the architecture that address these requirements will now be discussed.

Adversary and Trust Properties: The goal is to provide end-to-end protections against a holistic threat model. Within the SDN domain, this would entail protecting both the control plane and the data plane (e.g., from BGP hijacking). However, prior works on IoT security gateways have typically only considered a narrow threat model.

To this end, such an adversary systematically defined with a goal of inhibiting the gateway's protections (i.e., enable exploiting a protected IoT device). It is assumed that the adversary has knowledge of the security architecture as well as network access to all devices. Adversary capabilities are grouped into two categories: (1) the ability to compromise a device's software stack (i.e., software on the controller or gateway: "A" and "B" in FIGS. 1), and (2) the ability to inject/modify network messages (i.e., the control, data channels: "C" and "D" in FIG. 1).

A set of adversary capabilities are summarized in Table 1. These capabilities inhibit the architecture's ability to protect an IoT device and, when taken together, form an adversary model.

TABLE 1

| Example Threat | Vector | Violates |
|---|---|---|
| Modify controller software (e.g., security policy) | A | $P_{sw1}$, |
| Modify gateway software (e. g., middlebox config) | B | $P_{sw2}$ |

TABLE 1-continued

| Example Threat | Vector | Violates |
|---|---|---|
| Spoof command (e.g., add routing rule) | A or B | $P_{sw3}$ |
| Spoof control channel message (e.g., vSwitch route) | C | $P_{comm4}$ |
| Tamper with data channel message (e.g., skip middlebox) | D | $P_{comm5}$ |

While not a complete list, the example threats in Table 1 are used to define the fundamental security properties needed for the trusted architecture. Based upon the adversary model in Table 1, there are a minimum of five fundamental properties required for a trusted security gateway architecture.

Data Isolation and Mediation (Psw1): The ability to isolate security critical logic (e.g., keep the OS from accessing the security policy) and the ability to have a trusted entity mediate access to security critical data (e.g., blocking an untrusted application's access to secret keys)

Software Integrity (Psw2): The ability to detect code and data modifications (e.g., changes in middlebox configuration).

Secure Control Channel (Pcom1): The ability to trust data transferred between the controller and gateway (e.g., the gateway only executes commands from the controller).

Secure Data Channel (Pcom2): The ability to trust that packets are routed through the correct middleboxes (e.g., packets should not be processed by a wrong middlebox).

The architecture may support additional adversarial properties, but fouses on these four as being fundamental to a trusted architecture. These fundamental properties can be grouped into: (1) protecting running code and data ($P_{sw}$) and (2) protecting communications ($P_{com}$).

Formal Model

To guide and inform the design of the trustworthy architecture, a formal model of current software-defined IoT security gateway architectures is created. This model aids in the identification of critical components and interfaces of the architecture, formally define and encode the corresponding architectural elements, and prove desired trust and security properties.

A model of bolt-on IoT security architectures may be created, in some embodiments, using the Alloy modeling language (See FIG. 5, Listing 1). Alloy models are defined using first-order, relational logic. At its core, the Alloy language is an easy to use but expressive logic based on the notion of relations. The Alloy model is compiled into a scope-bound satisfiability problem and analyzed by off-the-shelf SAT solvers. This analysis can be used to identify if an instance of the model exists and to identify counterexamples to constraints. This analysis is used to identify attack vectors, refine security architecture, and to formalize our trust properties.

Figure 4:
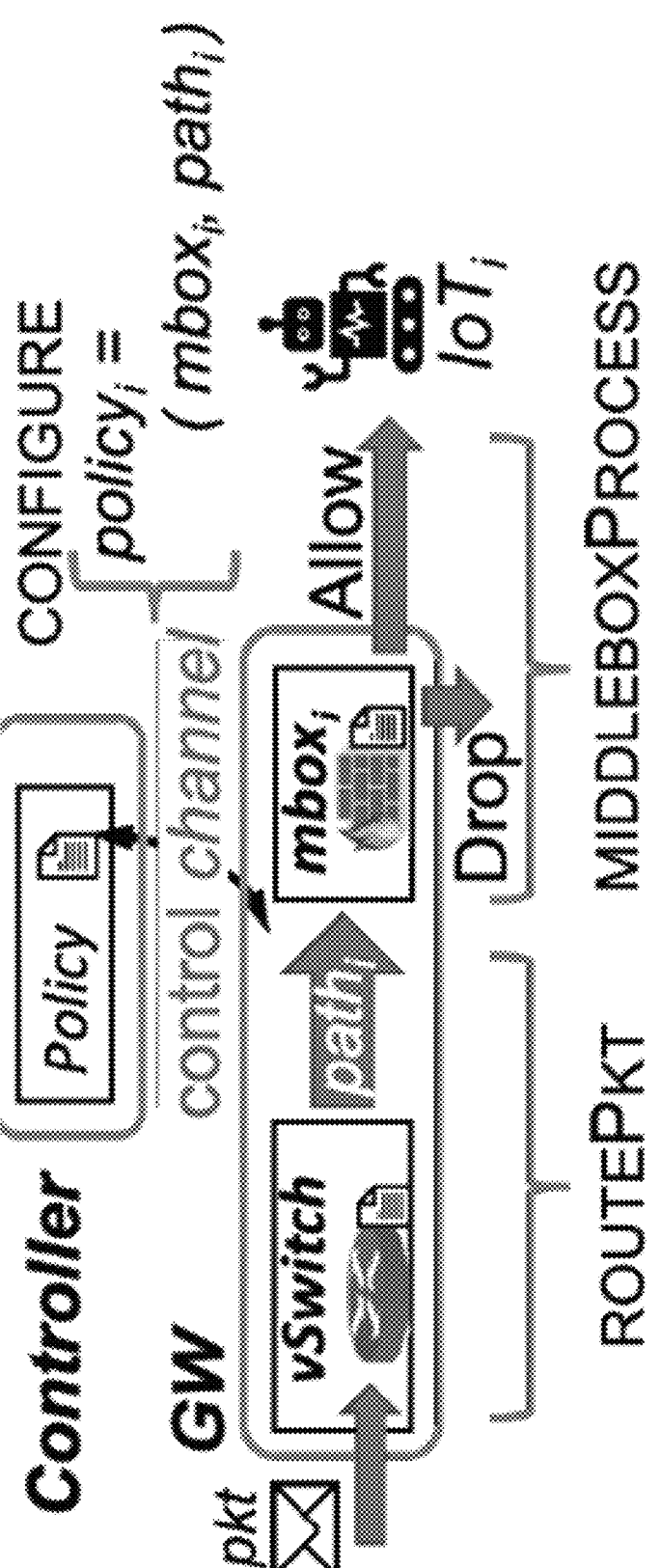
FIG. 4 is a block diagram showing a key component of the architectural model.

Model Description and Semantics—The bolt-on software-defined IoT security architecture model, shown in block diagram form in FIG. 4, comprises a centralized controller and a set of gateways that process packets to and from IoT devices. For brevity, an exemplary architecture with a single gateway is used to explain the abridged Alloy model in Listing 1.

Two key entities are modelled first: a Controller and a Gateway, using Alloy's sig interface (lines 1-10 of Listing 1). A sig (signature) defines a set (e.g., Controller) and its relationship to other sigs (i.e., each Controller has one Policy, see line 2 of Listing 1). The Controller maintains the security policy and uses the control channel to configure each Gateway based on the policy. Each Gateway is managed by the associated controller. The Gateway receives its policy over the control channel and installs paths in the vSwitch and then instantiates the middleboxes. Each path specifies to which middlebox traffic of a specific IoT device should be routed through.

The manner in which the Gateway processes packets is modelled using Alloy's fun (function) interface (see lines 11-18 of Listing 1). A function evaluates a series of statements and returns all possible solutions. A packet received by the Gateway is sent to the vSwitch for routing. The vSwitch routes the packet to the specific middlebox (ROUTEPKT, see line 12 of Listing 1). The middlebox then processes the packet and determines if the packet is benign or malicious (MIDDLEBOXPROCESS, see line 13 of Listing 1). Packets that are benign are routed back to the switch and then sent out to the IoT device, while all other packets are dropped.

Next, a trusted gateway architecture is defined using Alloy's pred (predicate) interface (see lines 19-27 of Listing 1). A predicate evaluates a series of constraints. It returns true only if all of the constraints are met, otherwise, false is returned. Thus, for an architecture to be trusted, the following conditions must all be met. First, an attacker must not be able to tamper with the policy on the controller (i.e., TAMPERPROOF is true in line 21 of Listing 1), Second, the control channel between the controller and the gateway must be secure so that it is immune to an attacker injecting malicious messages (i.e., SECURECHANNEL is true in line 22 of Listing 1). Third, the correct software must be running on the controller, vSwitch, and middle box (CORRECTSW is true for lines 23-26 of Listing 1). Finally, each packet must follow the path specified by the controller and enforced by the vSwitch and each middlebox (AUTHENTICATER-OUTE is true in line 27 of Listing 1). If all of these conditions are true then the gateway architecture deemed to be trusted.

Finally, a goal that all output packets were processed correctly is defined using Alloy's assert interface (see lines 28-31 of Listing 1). In Alloy, an assert claims that a series of statements must be true based upon the model, and will generate a counterexample if any of the claims do not hold to be true. A trusted gateway architecture can achieve this goal. Specifically, it allows all benign packets while dropping all malicious packets.

Using the architectural model and semantics, the overarching security property and its sub-properties are defined.

Overarching Security Property: Given a network where all of an IoT device's inbound and outbound traffic goes through the trusted security gateway, the goal is to ensure that any packet pkt output by the gateway was processed by the correct middlebox, such that benign packets are allowed and malicious packets are dropped (modeled in Listing 1). This can be denoted as:

$$\forall\, pkt \in BenignPkt,\ processPkt(pkt, GW) = \text{Allow} \qquad (1)$$

$$\forall\, pkt \in MaliciousPkt,\ processPkt(pkt, GW) = \text{Drop}$$

To achieve this property in the presence of an attacker, the gateway architecture must be trusted, which can be expressed formally as:

$$TrustedGateway(GW, Controller) \Leftrightarrow tamperProof(policy) \land \qquad (2)$$

$$correctInstance(GW, Controller) \land secureChannel(GW, Controller) \land$$

$$\forall\, mBox_i, authenticateRoute(vSwitch, mbox_i)$$

where:

$$GW = \{channel, vSwitch, \{mbox_0., \dots, mbox_n\}\}$$

$$Controller = \{channel, policy\}$$

Eqs (1,2) are realized in Alloy as shown in Listing 1, where gateway architectures are instantiated with a Controller and Gateway that processes packets using a software middlebox. The PROCESSPKT function determines if each packet is benign, and therefore allowed to be forwarded to its final destination or is malicious and is dropped. The TRUSTEDGATEWAY predicate tests if an architecture (composed of a Gateway and a Controller) is trustworthy. The model verifies that the Controller is assigned to the Gateway, that the Controller's security policy is tamper proof, that the channel between the Controller and the Gateway is secure, that the controller, vSwitch and all middleboxes are attested to be correct and that each packet being processed follows an authenticated route. A gateway meeting these requirements ensures that all benign packets are allowed and malicious packets are dropped (confirmed with the assert interface).

The overarching security property is further decomposed into four sub-properties. These sub-properties can be broadly grouped into two categories: (1) protecting data and running code ($P_{sw1}$, $P_{sw2}$) and (2) protecting network communications ($P_{com1}$, $P_{com2}$). Each of these will now be discussed in more detail.

Security Policy Isolation and Mediation ($P_{sw1}$): The first sub-property is to protect the security policy (data) stored in the Controller. Controller applications are subject to attacks which make the security policy vulnerable. As the correctness of the rest of the system is based upon this policy, the policy must be tamper-proof. To achieve this, the security policy is isolated in protected memory and all accesses require mediation by a trusted entity (see Listing 2, FIG. 6). Such defenses block the OS and other untrusted applications from accessing and modifying the security policy. This can be denoted as:

$$tamperProof(policy) \Rightarrow \qquad (3)$$

$$isolatedMemory(policy) \land mediatedAccess(policy)$$

Listing 2 depicts how Eq. (3) is modelled in Alloy. The TAMPERPROOF predicate checks if an object is located in isolated memory and all accesses are mediated. The assert interface checks that a controller's policy is tamper-proof.

Component Instance Validation ($P_{sw2}$): Besides the security policy, the software of key components must not be altered by an attacker (e.g., Attack B in Table 1). To achieve this, a validation that the correct instances of key components are running is needed. This includes validating the Controller, the vSwitch and all middleboxes (see Listing 3, FIG. 7). Where each middlebox instance is the type and configuration (e.g., rule set) currently specified by the controller's security policy. This can be denoted as:

$$correctInstance(GW, Controller) \Leftrightarrow \qquad (4)$$

$$remoteAttest(Controller) \land remoteAttest(vSwitch) \land$$

$$\forall\, mbox_i, remoteAttest(mbox_i)$$

The implementation of Eq. (4) is modelled in Listing 3. The predicate REMOTEATTEST checks that an object has the correct software and its correctness can be attested. This is then verified by asserting it for the controller, the vSwitch, and each middlebox.

Control Message Integrity and Authentications ($P_{com1}$): To protect against control channel attacks (e.g., Attack C in Table 1), assurances are provided that the control channel is secure. To achieve this, the control channel needs to be authenticated and encrypted so that data transmitted over the channel has not been modified or spoofed (e.g., only the controller can send middlebox configuration commands to the gateway). Meanwhile, the secret keys used by the channel are isolated and any access is mediated by a trusted entity (see Listing 4, FIG. 8). This can be denoted as:

$$secureChannel(channel) \Leftrightarrow authenticatedEncrypted(channel) \land \qquad (5)$$

$$isolatedMemory(keys) \land, mediatedAccess(keys)$$

A model of the Alloy implementation of Eq. (5) is shown in Listing 4. The TRUSTWORTHYCHANNEL predicate checks that the channel (i.e., the method being used to send messages between the Controller and the Gateway) uses authenticated encryption and that the encryption keys are tamper-proof. The assert then verifies that the channel between the Gateway and the Controller uses authenticated encryption and both hosts protect the encryption keys.

Packet Path and Data Validation ($P_{com2}$): Each packet must be routed to the correct middlebox as specified by the security policy. Prior work on internet routing has advocated for per-hop path authentication to validate that packets follow the specified path. Herein, similar guarantees are provided to detect packets maliciously routed to the wrong middlebox (e.g., Attack D in Table 1). In particular, the intended path of a packet must be enforced, and whether packet data has been modified (see Listing 5, FIG. 9). This can be denoted as:

$$authenticateRoute(vSwitch, mbox_i) \Leftrightarrow \qquad (6)$$

$$\forall\, pkt, intendedPath(pkt, policy) =$$

$$mbox_i \Longrightarrow actualPathj(pkt) = vSwitch \rightarrow mbox_i \rightarrow vSwitch$$

Listing 5 in FIG. 9 depicts the Alloy implementation of Eq. (6). The function GETPATH provides the mapping of packets to the appropriate middlebox and returns the packet's sequence of hops on the gateway. Next, the predicate AUTHENTICATEDHOP is defined, which checks to ensure that the packet was not modified and that it arrived at the correct hop location. It is verified that packers being processed by the Gateway follow authenticated routes using the assert statements to ensure the packet follows the correct path and that the packet is not modified at each hop location.

A system that provides these properties will, by construction, stop the example attacks in Table 1. As shown in Table 2, security policy isolation and mediation ($P_{sw1}$) blocks an attacker from modifying the security policy (Attack A in Table 1). Component instance validation ($P_{sw2}$) enables the architecture to detect an attacker modifying a middlebox (Attack B in Table 1). Control message integrity and authentication ($P_{com1}$) blocks an attacker from being able to inject malicious control messages (Attack C in Table 1). Finally, packet path and data validation ($P_{com2}$) mitigates local attackers modifying packets (Attack D in Table 1). 4

TABLE 2

| Attack | Security Properties | Solutions |
|---|---|---|
| A | $P_{sw1}$ | Limit access to security critical operations |
| B | $P_{sw2}$ | Verify component matches expected |
| C | $P_{com1}$ | Block control channel injections |
| D | $P_{com2}$ | Identify packet path modifications |

In additional embodiments, the architecture supports additional properties, but focuses on those presented herein as fundamental to a trusted architecture. The fundamental properties can be grouped into one of: (1) protecting running code and data ($P_{sw}$) and (2) protecting communications ($P_{com}$). One approach for providing these will now be disclosed.

Supporting Dynamic Middleboxes

Ideally, the entire codebase on both the control and data planes of the IoT device could be robustly protected from an attacker. However, this is impractical as it either incurs significant performance costs (e.g., multiple enclaves to process each packet) or requires significant reimplementation (e.g., migrating 100,000+ lines of C/Java). Instead, fine-grained security properties are applied to the portions of the codebase that impact the architecture's protections, thereby creating a robustness against an adversary. Specifically, periodic, remote attestations are applied to guarantee the code's integrity (providing $P_{sw2}$). This allows the code to run with minimal performance degradation, while bounding the duration it is vulnerable to attack. Additionally, critical code (e.g., security policy) can be protected with a hypervisor extension to isolate it and mediate access to it (providing $P_{sw1}$).

Periodic, Remote Attestation: IoT security gateways rely upon a large codebase to provide device-specific protections. Prior methods of remote attestation, such as Trusted Platform Modules (TPM), are used to precisely guarantee that the appropriate software stack is running (providing $P_{sw2}$). Upon boot, the correct baseline software stack, composed of the microhypervisor, OS, and critical software components (e.g., controller, vSwitch, middleboxes, etc.) is verified.

Subsequently, new modules that will impact the provided protections (e.g., the code of a new middlebox prior to loading) are attested, thereby allowing the architecture to ensure that the correct protections are instantiated.

During runtime, critical modules (e.g., controller, vSwitch, middleboxes) are periodically re-attested, thereby ensuring an attacker has not tampered with them. For example, the middlebox code must be run outside of the hypervisor to enable high packet throughput. To bound the potential impact of an attacker tampering with this code (i.e., the protection not being applied), the controller remotely attests critical software components on the gateway at the end of every epoch, where the epoch duration can be adjusted to provide a trade-off between the vulnerable window's length and the security overhead.

A virtual trusted platform module (vTPM) on the microhypervisor is leveraged to provide this attestation capability. A vTPM is a software implementation of a physical TPM and provides many of the same capabilities. Specifically, its ability to securely store a chain of measurements, by extending a program control register (PCR), and securely providing those stored values (i.e., a PCR quote) is used. These two capabilities enable determining if a software stack on a local or a remote machine matches a known configuration. These vTPM measurements can be applied at a fine granularity, with separate storage for multiple measurements.

Protecting the Controller's Security Policy: While attestation can provide significant guarantees about a code's integrity, there are some pieces of code that merit further protection (e.g., code impacting decisions about the protections provided by the security gateway). The microhypervisor approach enables selectively isolating this code (Psw1) and requiring that access to it be mediated by a trusted entity (Psw1). Examples of such pieces of code are the secret keys used to establish a secure control channel between the planes and the security policy on the controller.

As a concrete example, consider the controller's security policy. The security policy is critical to ensuring the correct protections are implemented (e.g., modifying it could result in the gateway's middleboxes not protecting the IoT devices). This code can be extracted from the controller and placed into memory isolated by the microhypervisor (providing Psw1). Further, access to this memory is mediated by the code white-list of the microhypervisor (providing Psw1), to ensure that only the controller's code can access the security policy.

This combination prohibits an attacker in control of the operating system from accessing and modifying microhypervisor-protected pieces of code, without requiring significant changes to existing code.

Secure and Efficient Communication

The security architecture requires trust guarantees on both the control channel (between controller and gateway, Pcom1) and the data channel (along the gateway's packet processing path, Pcom2). The microhypervisor is used to provide isolation and mediation to secure these communication channels.

Secure Control Channel: It is crucial that communication between the control plane and the data plane can be trusted as these messages often impact the security protections provided by the gateway. The architecture bolsters the guarantees provided by traditional tunneling (e.g., IPsec/TLS) between the controller and the gateway to ensure a compromised controller or gateway cannot send spoofed messages over the tunnel (e.g., malicious middlebox configuration commands). To protect these communications (Pcomm1), a trusted agent pair running in the microhypervisor is used to mediate these communications (e.g., access the secret keys required to send data over this channel). There is an agent on the controller and a corresponding agent on the gateway, which together are responsible for mediating access to the secure channel.

Secure Data Channel: On the data plane, the security protections are dependent upon each packet being processed by the correct middlebox. The architecture provides per-hop guarantees with a low performance overhead. Specifically, the goal is to guarantee that packets follow the correct path and are processed by the correct sequence of middleboxes on the data plane (Pcom2). While traditional tunnels could be established between each middlebox and the vSwitch, this would result in significant overhead and processing delays. To protect the data channel, the microhypervisor is used to enforce the correct path (i.e., middlebox chain) for each packet. This is achieved by having the microhypervisor sign and verify each packet along its processing path and dropping packets that fail verification. This approach differs from prior per-hop authentication proposals as packets remain on a single host where a hypervisor can maintain secret keys.

These digital signatures create a connection between the raw packet data and the middlebox processing the packet, by the secret key (protected by the microhypervisor) shared between the vSwitch and each middlebox. Furthermore, the digital signatures can be trusted, as the secret keys are kept in isolated memory only accessible by the microhypervisor's mediation, stopping an attacker from forging signed packets.

Model Evaluation

The Alloy model disclosed above was updated to reflect the trusted architecture and analyze its performance. The architecture's model was probed for instances that would allow an attacker to violate the trust property and output a malicious packet (i.e., one containing an exploit).

The Alloy Analyzer was unable to identify a counter example resulting in the architecture output a packet processed by an incorrect middlebox. The Analyzer employs bounded model checking (BMC), where models are evaluated up to a bound, N, of each sig in the model. The model was evaluated with up to a bound of 100 (i.e., 100 instances of each sig) and the resources required indicate that the analysis could be performed on a personal computer.

Additionally, constraints related to the security sub-properties were systematically removed (e.g., middlebox software does not need to be correct) and it was verified that each resulted in a counter example where the overarching security property was violated. This analysis provided confidence in the security properties in the architecture's design.

The Alloy model aided in identifying nuances and informed the refining of the design. The model highlighted the need to prohibit packets from completely skipping a middlebox. For example, if a middlebox signs input and output packets with the same key, it allows a packet to bypass the middlebox without being detected. Similarly, the Alloy model highlighted software components that needed either to be trusted or to be regularly attested to trust the architecture's operation. Beyond just the middlebox processing the packet, both the virtual switch and the controller software need to be trusted to ensure correct operation.

Implementation

An exemplary embodiment will now be disclosed. In one embodiment, the uberXMHF open source microhypervisor that supports both x86 and ARM platforms is used. A Raspberry Pi 3 hardware platform can be used to execute the uberXMHF microhypervisor, the Raspbian Jessie (Linux 4.4. y) and Open Virtual Switch and Snort on the gateway.

Figure 3:
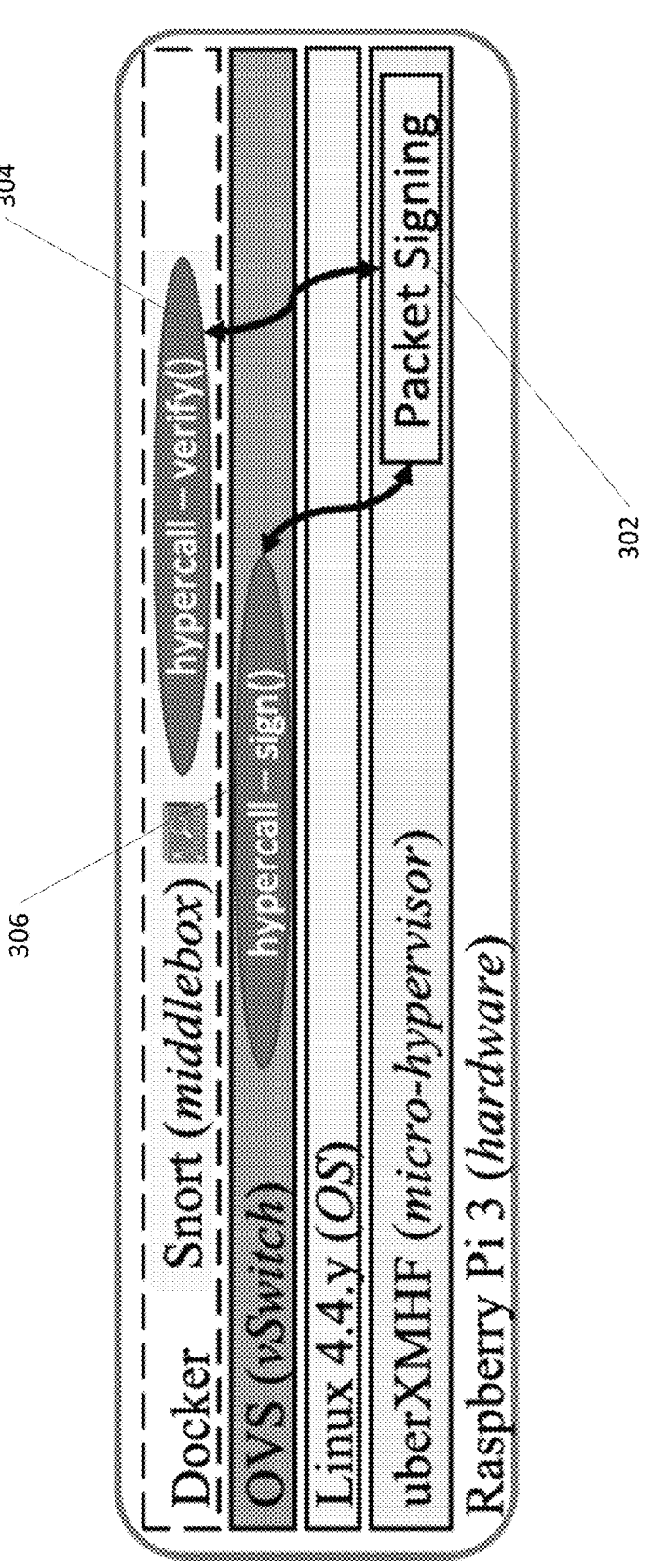
FIG. 3 is a high-level block diagram of the architecture's stack on a data plane implementation.

A high-level overview of the software stack of the implementation is shown in FIG. 3 where the hypervisor extension 302 is depicted as the rectangle labelled "Packet Signing". Ovals 304, 306 represent hypercalls to the hypervisor extension 302, added to the commodity software to perform a hypervisor protected operation (e.g., creating/verifying a digital signature for a packet). These elements of the architecture implementation are exemplary only and, as would be realized, implementation using other elements are contemplated to be within the scope of the invention.

Virtual Trusted Platform Module (vTPM): The architecture leverages a hypervisor-enabled vTPM to provide periodic, remote attestation. A key motivation in the development of Trusted Platform Modules (TPM) was to provide the ability to remotely attest the health of a system's boot sequence. A subset of the features provided by the TPM standard are leveraged to provide trust properties, specifically PCR extend and PCR quote. In addition to a vTPM not requiring additional hardware, it provides two key benefits over a physical TPM, increased storage and increased performance. The measurement storage (i.e., PCRs) on a vTPM is based upon the platform's memory region protected by the microhypervisor, allowing for a large number of separate measurements (e.g., >200 PCRs on a single 4 KB page). Furthermore, these measurements are not limited by the data rate of a system bus (e.g., SPI on a Raspberry Pi 3), reducing access latency by over 20×. A challenge for software-based TPMs is preserving secrets across reboots. The vTPM leverages existing platform non-volatile memory to preserve secrets across boots (e.g., the Raspberry Pi 3 has a boot NVRAM that can act as a long-term secure storage).

In one embodiment, the architecture may be implemented as a trustworthy "security-as-a-service" offering that providers (e.g., edge ISPs, CDNs, IoT providers) could offer to IoT consumers, ensuring the correct security protections are applied at all times. For instance, the architecture provides a trusted mechanism for enforcing IoT security best practices (e.g., access-control policies in a device's manufacturer usage description specification).

As would be realized by one of skill in the art, the disclosed systems and methods described herein can be implemented by a system comprising a processor and memory, storing software that, when executed by the processor, performs the functions comprising the method. For example, the training, testing and deployment of the model can be implemented by software executing on a processor.

As would further be realized by one of skill in the art, many variations on implementations discussed herein which fall within the scope of the invention are possible. Specifically, many variations of the architecture of the model could be used to obtain similar results. The invention is not meant to be limited to the particular exemplary model disclosed herein. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method for verifying a trusted gateway for IoT devices, the method comprising:
   creating a model of the trusted gateway by:
      defining, in a modelling language, a controller defining a control plane for the IoT device, the controller executing software that is either protected by or attested by a controller microhypervisor; and
      defining, in a modelling language, a security gateway defining a data plane attested by a security gateway microhypervisor;
   compiling the model into a mathematical logic problem; and
   evaluating the model using a mathematical logic solver;
   wherein the model includes:

a function comprising one or more statements specifying how data packets sent to and received from an IoT device are processed, the function specifying that a packet received by the security gateway is sent to a vSwitch for routing to a specific middlebox which determines if the packet is benign or malicious;

a predicate comprising one or more constraints that must be satisfied to establish the trusted gateway, the constraints including at least one of the group consisting of a constraint preventing an attacker from tampering with policies of the controller, a constraint specifying that a control channel between the controller and the gateway must be secure such as to be immune to an attacker injecting malicious messages, a constraint specifying that correct software must be running on the controller, vSwitch and each middlebox, and a constraint specifying that each packet must follow a path specified by the controller and enforced by the vSwitch and each middlebox; and an assert interface comprising one or more statements that must evaluate as true and providing counterexamples if any statement does not evaluate as true.

2. The method of claim 1 wherein:

the controller is defined in the modelling language by a controller signature interface; and the security gateway is defined in the modelling language using a gateway signature interface.

3. The method of claim 2 wherein the controller signature interface comprises:

a security policy; and a channel, wherein the channel is used to configure the gateway signature interface, based on the security policy.

4. The method of claim 3 wherein the gateway signature interface comprises:

the vSwitch; and one or more middleboxes;

wherein the gateway signature interface installs paths in the vSwitch based on security information received from the controller signature interface over the channel.

5. The method of claim 4 wherein each path is associated with a middlebox through which traffic to and from a specific IoT device is routed.

6. The method of claim 5 wherein the security policy specifies a path for each middlebox.

7. The method of claim 4 wherein the vSwitch is modelled to evaluate each of the data packets in accordance with the function and:

route benign data packets to the IoT device; and drop malicious data packets.

8. The method of claim 4 wherein each data packet follows the path specified by the controller and enforced by the vSwitch and each middlebox.

9. The method of claim 1 wherein the one or more statements in the assert interface specify that all benign packets are allowed to be transmitted while all malicious packets are dropped.

10. A method of verifying a trusted gateway for IoT devices comprising:

evaluating the model of claim 1 to determine if counterexamples of any of the one or more statements in the assert interface exist.

11. The method of claim 1 further comprising evaluating the model to determine if counterexamples of any of the one or more statements in the assert interface exist.

12. The method of claim 1 further comprising, in evaluating the model, determining if counterexamples of any of the one or more statements in the assert interface exist.

* * * * *